(12) United States Patent
Maurer et al.

(10) Patent No.: US 11,542,421 B2
(45) Date of Patent: Jan. 3, 2023

(54) THERMAL CONTACT AND FILLING MATERIAL, AND STORAGE BATTERY ASSEMBLY HAVING A THERMAL CONTACT AND FILLING MATERIAL

(71) Applicant: Polytec PT GmbH, Karlsbad (DE)

(72) Inventors: Arno Maurer, Ettlingen (DE); Benjamin Stösser, Mannheim (DE)

(73) Assignee: Polytec PT GmbH, Karlsbad (DE)

( * ) Notice: Subject to any disclaimer, the term of this patent is extended or adjusted under 35 U.S.C. 154(b) by 172 days.

(21) Appl. No.: 16/966,916

(22) PCT Filed: Jan. 30, 2019

(86) PCT No.: PCT/EP2019/052263
§ 371 (c)(1),
(2) Date: Aug. 3, 2020

(87) PCT Pub. No.: WO2019/154694
PCT Pub. Date: Aug. 15, 2019

(65) Prior Publication Data
US 2021/0047550 A1    Feb. 18, 2021

(30) Foreign Application Priority Data
Feb. 9, 2018    (DE) .......................... 102018102989.6

(51) Int. Cl.
*H01M 10/653*    (2014.01)
*C09K 5/14*    (2006.01)
(Continued)

(52) U.S. Cl.
CPC .................. *C09K 5/14* (2013.01); *C08K 5/10* (2013.01); *H01M 10/653* (2015.04);
(Continued)

(58) Field of Classification Search
None
See application file for complete search history.

(56) References Cited

U.S. PATENT DOCUMENTS

| | | | | |
|---|---|---|---|---|
| 5,591,789 A | * | 1/1997 | Iruvanti | ................... C08K 3/01 524/404 |
| 8,597,812 B2 | | 12/2013 | Terada et al. | |
| 9,413,047 B2 | | 8/2016 | Moschet et al. | |

(Continued)

FOREIGN PATENT DOCUMENTS

| | | |
|---|---|---|
| CN | 105754229 | 7/2016 |
| DE | 102007039900 | 10/2008 |

(Continued)

OTHER PUBLICATIONS

PLYSURF A212E, Material Safety Data Sheet, DKS Co. Ltd., 8 pages, Jul. 11, 2011.

(Continued)

*Primary Examiner* — Wyatt P McConnell
(74) *Attorney, Agent, or Firm* — Volpe Koenig

(57) ABSTRACT

A thermal contact and filling material having at least one thermally conductive filler and at least one silicone-free base oil. The thermally conductive filler is a metal hydroxide, in particular aluminum hydroxide, and the thermal contact and filling material also has at least one chemically crosslinkable prepolymer mixture. A storage battery assembly, in particular for a vehicle, is provided including at least one carrier, at least one storage battery element, which storage battery element is arranged on the carrier, and at least one bottom plate, wherein the carrier is arranged on the bottom plate. The storage battery assembly includes, at least between the bottom plate and the carrier and/or between the storage battery element and the carrier, a thermally conductive layer, which is formed of the thermal filling and contact material.

15 Claims, 3 Drawing Sheets

(51) Int. Cl.
*H01M 50/24* (2021.01)
*H01M 50/20* (2021.01)
*C08K 5/10* (2006.01)

(52) U.S. Cl.
CPC ........... *H01M 50/20* (2021.01); *H01M 50/24* (2021.01); *C08K 2201/001* (2013.01); *C08L 2205/025* (2013.01); *H01M 2220/20* (2013.01)

(56) References Cited

U.S. PATENT DOCUMENTS

| | | | | |
|---|---|---|---|---|
| 2012/0119626 | A1* | 5/2012 | Takahashi | H02N 1/006 174/254 |
| 2012/0263988 | A1* | 10/2012 | Obasih | B60L 50/66 429/98 |
| 2015/0163958 | A1 | 6/2015 | Oguma et al. | |
| 2015/0197680 | A1 | 7/2015 | Frank | |
| 2016/0312097 | A1* | 10/2016 | Kitada | C08K 3/22 |
| 2017/0117208 | A1 | 4/2017 | Kasztelan et al. | |
| 2018/0092806 | A1 | 4/2018 | Okamoto et al. | |

FOREIGN PATENT DOCUMENTS

| | | |
|---|---|---|
| DE | 102012109500 | 4/2014 |
| DE | 1020151161104 | 4/2016 |
| DE | 112013007713 | 12/2016 |
| DE | 102015118245 | 4/2017 |
| JP | 2009013237 | 1/2009 |
| WO | 2012013789 | 2/2012 |

OTHER PUBLICATIONS

Compendium: Li Ion Batteries, In the BMWi SUppot Programme IKT for Electromobility II: Smart Car, Smart Grid, Smart Traffic, Fundaments, Assessment Criteria, Laws and Standards, 7 pages, Jul. 2015.

Helmut Tschoke (editor), The Electrification of Drivetrain, Basic Knowledge, 13 pages, May 2021.

Wikipedia, Diisodecyl phthalate, https://de.wikipedia.org/wiki/Diisodecylphthalat, 5 pages.

* cited by examiner

THERMAL CONTACT AND FILLING MATERIAL, AND STORAGE BATTERY ASSEMBLY HAVING A THERMAL CONTACT AND FILLING MATERIAL

BACKGROUND

In the operation of electronic and energy-handling systems, heat is evolved and this has to be removed quickly and effectively from the heat-producing unit. To establish thermal contact of the active components with the corresponding heat input or output conduits, a fixed mechanical contact is classically produced either by means of screws, clamps or by material-to-material bonding in the form of soldering or welding. Although mechanical fixing has the advantage that the connection is releasable, the heat transfer between the active components occurs only via a few contact points. Since a layer of air is present in between and this air is a very poor conductor of heat, the heat generated is removed only incompletely. In order to improve heat transfer, thermally conductive materials are therefore introduced into the join between the active components, i.e. between the heat-generating component and the heat-removing component.

Such thermally conductive materials are known, for example in the form of heat-conducting pastes, from microelectronics and they make the removal of heat from semiconductor chips possible. Such heat-conducting pastes usually consist of a thermally conductive filler comprised of metallic or ceramic particles, for example aluminum oxide, and a silicone-containing base oil as binder.

DE 10 2015 118 245 A1 discloses, for example, a heat-conducting paste for electronic components which contains aluminum oxide as filler together with a silicone-containing base oil.

Such heat-conducting pastes generally satisfy the requirements of microelectronics by being able to be introduced in a simple manner into the join between the active components and, due to their paste-like properties, also being able to be removed again. Furthermore, they can also be used in large-volume technical applications, for example for thermal contacting in heat exchangers. However, due to their paste-like properties, such heat-conducting pastes have little suitability for applications which are subjected to mechanical stresses. Mechanical stresses such as vibrations or movements can result in the heat-conducting paste being squeezed out from the join between the active components, so that air enters the join. Such mechanical stresses play a significant role in, for example, vehicles, for which reason suitable operational security of the thermally conductive materials in the event of impact, vibration and an inclined position is desirable in the cooling of vehicle components. The formation of an air layer between the active components can lead to local overheating of the heat-removing components, as a result of which their ability to function is restricted. Thus, the escape of the heat-conducting paste from the join can cause failure of the heat-generating component.

SUMMARY

It is therefore an object of the present invention to provide a thermal contact and filling material which compared to the heat-conducting pastes known from the prior art is suitable for large-volume applications and, in particular, better withstands potential mechanical stresses.

This object is achieved according to the invention by a thermal contact and filling material having and a rechargeable battery arrangement having one or more features described herein. Advantageous further developments of the inventive concept are the subject matter of the claims.

A thermal contact and filling material according to the invention comprises at least one thermally conductive filler and at least one silicone-free base oil. It is important here that the thermally conductive filler is a metal hydroxide, in particular an aluminum hydroxide, and that the thermal contact and filling material further comprises at least one chemically crosslinkable prepolymer mixture.

Compared to the heat-conducting pastes known from the prior art, the thermal contact and filling material of the invention has the advantage that a metal hydroxide, which is typically of low relative density and inexpensive, is used as thermally conductive filler. It is within the scope of the invention for the metal hydroxide to be an aluminum hydroxide which has a significantly lower density of only 2.4 g/cm$^3$ compared to the density of 3.9 g/cm$^3$ of the frequently employed aluminum oxide. A lower density of the components used in the thermal contact and filling material has a preferred effect on its range of applications. In the case of large-volume applications, a relatively low density and the associated reduction in the weight of the thermal contact and filling material is preferably desirable. However, the invention is not restricted thereto.

Furthermore, the metal hydroxides used are typically significantly less abrasive compared to the metal oxides, so that they are gentle on not only the active components but also any components of metering units with the aid of which the thermal contact and filling material of the invention is processed. In this way, premature material wear of the active components and of the metering units can be avoided in an advantageous way.

A further advantage of the invention is that the thermal contact and filling material of the invention contains a silicone-free base oil as binder. It is generally known that silicone-containing base oils contain small amounts of volatile silicone compounds which can be given off from the base oil into the surrounding air. These volatile silicone compounds can be deposited on surfaces which surround the active components. If surface-coating or adhesive-bonding processes are subsequently to be carried out on these contaminated surfaces, there is a risk that the adhesion of the surface coatings or adhesive layers will be lost. If the volatile silicone compounds get to electric contacts, they are decomposed by spark formation and form insulating oxide layers, as a result of which the function of the contacts is impaired or destroyed. The use of a silicone-free base oil therefore enables contamination of surrounding surfaces with volatile silicone compounds to be avoided in an advantageous way. Furthermore, the use of a binder in the form of a silicone-free base oil makes it possible to set the viscosity and thus the flowability of the thermal contact and filling material to a desired value. In this way, the viscosity and the flowability of the thermal contact and filling material can be set with a view to the planned application.

The presence of a chemically crosslinkable prepolymer mixture makes it possible, in an advantageous way, for the thermal contact and filling material to cure by chemical crosslinking to form a polymer after it has been introduced into a join between two active components. Compared to the paste-like thermally conductive materials known from the prior art, this prevents the thermal contact and filling material from escaping from the join and changing its position as a result of mechanical stresses due to vibrations and movements, as a result of which air could again get into the join between the active components of the heat-generating components. Local overheating of the heat-generating component is avoided thereby, as a result of which the life of these components is ultimately significantly increased.

It is within the scope of the invention for the chemical crosslinking of the polymer to be preferably effected by water, in particular in the form of atmospheric moisture. However, the invention is not restricted thereto.

The above-described thermal contact and filling material can preferably be provided for applications in the energy and electrical sectors in which relatively large volumes or gaps have to be filled in a thermally conductive and potentially reversible manner. This is primarily the case in powering batteries for electric vehicles, where meterable and repairable thermal contacting of Li ion cells or modules is of importance. In addition, the thermal contact and filling material can preferably also be used for further applications in industrial heating and cooling engineering, in electrical engineering, electronics and in machine construction. These applications are, for example, thermal connection of heat pipes in solar collectors and heat collectors, reversible thermal contacting in heat exchangers, heating and cooling tables, Peltier elements, heated pressing molds and extruders, embossing appliances, heating baths and reversible thermally conductive embedding or installation of motors, conducting-electronic components, LED lamps, sensors and temperature sensors.

In an advantageous embodiment, the chemically crosslinkable prepolymer mixture comprises at least one prepolymer and at least one crosslinker. It has been found to be advantageous for the prepolymer preferably to be an alkoxysilane-functionalized polyether. A strong and at the same time elastic thermal contact and filling material can typically be formed by polymerization of an alkoxysilane-functionalized polyether.

The use of a prepolymer and a crosslinker makes formation of a three-dimensional polymer network possible and thus allows the formation of an elastic, dimensionally stable material. This leads to even better optimization of the operational security under impact, vibration, an inclined position and changing temperatures of the heat-generating components. It is within the scope of the invention for the proportion of crosslinker relative to prepolymer to be able to be set so that a desired elasticity of the thermal contact and filling material is retained after crosslinking, so that the material can be detached again and removed without problems from the heat-generating components.

In a further advantageous embodiment of the thermal contact and filling material, the crosslinker is an organofunctional silane. For the purposes of the present compound, organofunctional silanes are hybrid chemical compounds which are silanes provided with reactive organic groups, as a result of which they can serve as crosslinker, i.e. as "molecular bridge" between prepolymers. Commercially available silanes contain, for example, amino, epoxy, glycidoxy, mercapto and sulfido, isocyanato, methacryloxy and vinyl groups.

It is also within the scope of the invention for the organofunctional silane to be able to be selected from the group consisting of vinyltrimethoxysilane, 3-aminopropyltrimethoxy, 3-glycidyloxypropyltrimethoxysilane. However, the invention is not restricted thereto.

In order to increase the reaction rate of the polymerization reaction of the prepolymer mixture, a further advantageous embodiment provides for the thermal contact and filling material to comprise a polymerization catalyst. The presence of a polymerization catalyst optimizes the curing rate of the thermal contact and filling material. It is within the scope of the invention for the type of polymerization catalyst to be able to be selected as a function of the composition of the prepolymer mixture and the desired properties of the crosslinked end product.

Since the thermal contact and filling material has to have sufficient flowability for automatic processability, a further advantageous embodiment of the thermal contact and filling material provides for the proportion of the thermally conductive filler in the thermal contact and filling material to be in the range from 50 to 90 percent by weight. Studies by the applicant have indicated that optimum viscosity and thus flowability can be achieved by the use of a proportion of the thermally conductive filler in the range from 50 to 90 percent by weight in the thermal contact and filling material.

Furthermore, the flowability and the viscosity of the thermal contact and filling material can be influenced by the proportion of the base oil. For this reason, the proportion of the silicone-free base oil in the thermal contact and filling material is, in a further advantageous embodiment, in the range from 5 to 50 percent by weight.

In a further advantageous embodiment of the thermal contact and filling material, the proportion of the chemically crosslinkable prepolymer mixture in the thermal contact and filling material is in the range from 1 to 15 percent by weight. Here, a smaller proportion of the chemically crosslinkable prepolymer mixture leads to a lower hardness and dimensional stability of the thermal contact and filling material in the fully polymerized state. Correspondingly, a larger proportion of the chemically crosslinkable prepolymer mixture leads to a greater hardness and dimensional stability. The desired properties of the thermal contact and filling material can thus be selected by the user in a simple way according to the planned application.

The silicone-free base oil of the thermal contact and filling material is preferably high-boiling; in particular, the silicone-free base oil preferably has a vapor pressure of $<10^{-4}$ hPa at a temperature of 20° C.

The silicone-free base oil of the thermal contact and filling material is preferably an ester. The use of esters as base oil is generally known, for example in the production of lubricants. These can be subdivided into synthetic products and those of natural origin, for example vegetable oils or animal fats. The ester used for the thermal contact and filling material is preferably a high-boiling, synthetic ester which displays a high oxidation stability and a low tendency to vaporize and can therefore also be used at elevated temperatures in the range from 50° C. to 150° C. The term "high-boiling ester" refers to esters having a vapor pressure of $<10^{-4}$ hPa at a temperature of 20° C.

In order to achieve an optimal crosslinking rate with a view to the planned use of the thermal contact and filling material, the thermal contact and filling material has, in a further advantageous embodiment, a curing rate of 0.1 mm/day to 10 mm/day, preferably from 0.5 mm/day to 7 mm/day, particularly preferably from 1 mm/day to 5 mm/day. As a result, the thermal contact and filling material can be introduced without a time pressure into the join between the active components and at the same time a long curing time can be avoided. This ultimately has a positive effect on the processability of the thermal contact and filling material.

In order to ensure an optimal flowability of the thermal contact and filling material, a further advantageous embodiment of the thermal contact and filling material provides for the thermal contact and filling material to have a dynamic viscosity in the range from 50 to 500 Pa s (measured using a rotational viscometer at 40° C.).

It is within the scope of the invention for the flowability of the thermal contact and filling material to be able to be set to a desired value by the addition of rheological additives. Such rheological additives can preferably be present in the thermal contact and filling material in amounts of from 0.1-5% by weight and serve to increase the viscosity of the thermal contact and filling material. However, the invention is not restricted thereto.

Furthermore, the thermal contact and filling material has, in a further advantageous embodiment, a thermal conductivity in the range from 1 to 5 W/m K. The thermal conductivity of the thermal contact and filling material is dependent on its composition and can be set appropriately by suitable selection of the components. This makes it possible for the thermal conductivity to be selected as a function of the application and at the same time for a cost-optimized material to be produced.

In a further advantageous embodiment of the thermal contact and filling material, this has a specific density in the range from 1.5 to 2.5 g/cm$^3$.

As mentioned above, the thermal contact and filling material of the invention has a silicone-free base oil. In a further advantageous embodiment, the thermal contact and filling material is silicone-free. This ensures that contamination of the surrounding surfaces by volatile silicone compounds from the base oil and also from other components of the thermal contact and filling material is avoided. An impairment of the function of further components in the environment of the heat-generating element can thus be prevented.

Another aspect of the present invention provides a rechargeable battery arrangement, in particular for a vehicle, which comprises at least one support, at least one rechargeable battery element and at least one bottom plate. The rechargeable battery element is arranged on the support, with the support being arranged on the bottom plate.

Rechargeable battery arrangements such as the rechargeable lithium ion battery are adequately known as powering batteries for electric vehicles in vehicle construction. Here, individual lithium ion cells are fastened on a support, with a plurality of supports with lithium ion cells being fastened to a bottom plate in order to increase the power of the rechargeable lithium ion battery. In order to conduct away the heat evolved in the lithium ion cells effectively, both the support and the bottom plate serve as heat-removing elements. Conventional cooling systems are based on liquid cooling or on the heat-conducting pastes described in the prior art. In the case of liquid cooling, there is the problem that the liquid does not flow uniformly in the join between the active components, as a result of which uniform heat removal cannot be ensured. As a consequence, a malfunction of the rechargeable battery arrangement can occur.

When commercially available heat-conducting pastes are used, the abovementioned disadvantages occur. For example, WO 2012/013789 A1 discloses a rechargeable battery arrangement having a plurality of rechargeable battery elements connected to one another and arranged in parallel with one another, with the heat generated by the rechargeable battery elements being removed via a heat-conducting paste which contains a silicone-containing base oil. As indicated above, such silicone-containing base oils contain small amounts of volatile silicone compounds which can be given off from the base oil into the surrounding air. If the volatile silicone compounds get to electric contacts, they are decomposed by spark formation and form insulating oxide layers, which impair or destroy the function of the contacts. This has an adverse effect on the life of the rechargeable battery arrangement.

In order therefore to make optimal heat removal possible and increase the life of the components of the rechargeable battery arrangement, the rechargeable battery arrangement of the invention therefore provides, as significant aspect, a thermally conductive layer which is arranged at least between the bottom plate and the support and/or between the rechargeable battery element and the support. The thermally conductive layer is formed by a thermal filling and contact material as described herein.

In order to optimize the stability of the rechargeable battery arrangement in the operating state, it is within the scope of the invention for the individual rechargeable battery elements to be mechanically fixed on the support and/or the support to be mechanically fixed on the bottom plate. This ensures the required impact strength of the rechargeable battery arrangement in the operating state. However, the invention is not restricted thereto.

During the course of operation of the rechargeable battery arrangement, failure of one or more rechargeable battery elements can occur, which decreases the power of the rechargeable battery arrangement. For this reason, defective rechargeable battery elements have to be removed with or without their supports from the bottom plate and replaced. In order to make it possible for such replacement to be carried out in a simple manner, a first advantageous embodiment of the rechargeable battery arrangement provides for the thermally conductive layer to be arranged detachably between the bottom plate and the support. This makes it possible for the thermal contact and filling material to be removed using moderate forces in the event of a correction, a repair or recycling of the rechargeable battery arrangement, as a result of which the support and/or the bottom plate are reusable.

In order to be able to even out manufacturing-related tolerances of the air gap of a few millimeters between the rechargeable battery elements and the support and/or the support and the bottom plate, the thermally conductive layer also preferably has thixotropic properties. These thixotropic properties can preferably be achieved by appropriate selection of the composition of the thermal contact and filling material. For example, a thixotropic thermally conductive layer can preferably be obtained by means of the proportion of the prepolymer mixture and/or the crosslinker and/or the base oil in the thermal contact and filling material. The thixotropic properties of the thermally conductive layer can also have, in a preferred manner, a positive effect on the dimensional stability of the layer, which increases the life of the thermally conductive layer and prevents the formation of an air layer having a poor thermal conductivity.

It is within the scope of the invention for the thermal contact and filling material of which the thermally conductive layer is made to contain further additives such as stabilizers in the form of rheological additives. The addition of such additives makes it possible to set the viscosity of the thermally conductive layer or of the thermal contact and filling material and preferably also influences the dimensional stability of the thermally conductive layer.

In an advantageous embodiment of the rechargeable battery arrangement, the thermally conductive layer has a layer thickness in the range from 0.1 mm to 10 mm, preferably from 0.5 mm to 5 mm, particularly preferably from 1 mm to 3 mm. The layer thickness can thus be matched optimally to the size of the gap between active components.

BRIEF DESCRIPTION OF THE DRAWINGS

Further advantageous properties of the invention may be derived from the following description of working examples with the aid of the drawing. The drawing shows.

DETAILED DESCRIPTION

Figure 1:
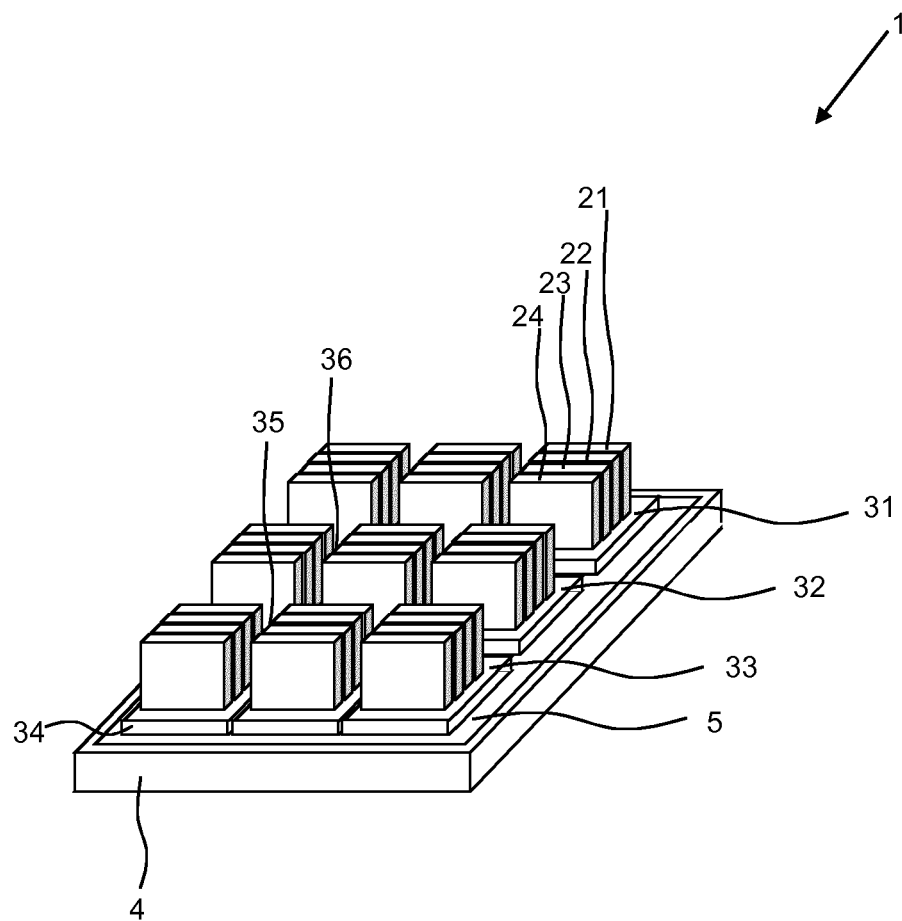
FIG. 1: a first working example of a rechargeable battery arrangement according to the invention in a perspective, schematic depiction.

FIG. 1 shows a first working example of a rechargeable battery arrangement 1 according to the invention. The rechargeable battery arrangement 1 has a plurality of rechargeable battery elements 21, 22, 23, 24, a plurality of supports 31, 32, 33, 34, 35, 36 and a bottom plate 4.

In the present working example, four rechargeable battery elements 21, 22, 23, 24 are installed on a support 31 and screwed to the latter. The support 31 is configured as thermally conductive plate and is in turn installed on the bottom plate and screwed to the latter. This ensures stability of the rechargeable battery arrangement 1 in the event of impacts or inclined positioning of the arrangement during operation. In the present working example, the support 31 and also the bottom plate 4 are made of metal. However, the invention is not restricted thereto. The support 31 and/or the bottom plate 4 can also be made of other thermally conductive materials such as graphite.

The rechargeable battery elements 21, 22, 23, 24 are arranged parallel to one another in a row and configured as lithium ion cells. However, the invention is not restricted thereto. It is therefore likewise within the scope of the invention for other types of rechargeable battery to be able to be used. Furthermore, the rechargeable battery elements 21, 22, 23, 24 can also be arranged in a different orientation relative to one another on the support 31, 32, 33, 34, 35, 36.

A further five supports 32, 33, 34, 35, 36 each having four rechargeable battery elements arranged parallel to one another are installed on the bottom plate 4, which has significantly larger dimensions compared to the support 31, and likewise screwed to the bottom plate. In the interests of clarity of FIG. 1, numbering of the further rechargeable battery elements has been dispensed with.

Within the scope of the invention, the number of supports 31, 32, 33, 34, 35, 36 and/or the number of rechargeable battery elements 21, 22, 23, 24 can also vary.

As can be seen from FIG. 1, a thermally conductive layer 5 is present between the supports 31, 32, 33, 34, 35, 36 and the bottom plate 4. The heat generated by the rechargeable battery elements 21, 22, 23, 24 and conducted away to the supports is conducted away via this layer 5 to the bottom plate 4. It is here within the scope of the invention for a thermally conductive layer 5 also to be installed between the rechargeable battery elements 21, 22, 23, 24 and the supports 31, 32, 33, 34, 35, 36 (not visible in FIG. 1).

The thermally conductive layer 5 consists, in the present working example, of a thermal contact and filling material according to the invention which contains, inter alia, aluminum hydroxide as filler and a high-boiling synthetic ester as silicone-free base oil.

As can also be seen from FIG. 1, the thermally conductive layer 5 has been applied over the full area between the six supports 31, 32, 33, 34, 35, 36 and the bottom plate 4. Furthermore, the layer has a layer thickness of 1 mm (not visible from FIG. 1). This makes optimal heat removal possible in the present working example. However, it is also within the scope of the invention for the thermally conductive layer 5 to be applied at points and/or in strips in a layer thickness in the range from 0.1 to 5 mm between the six supports 31, 32, 33, 34, 35, 36 and the bottom plate 4.

Figure 2:
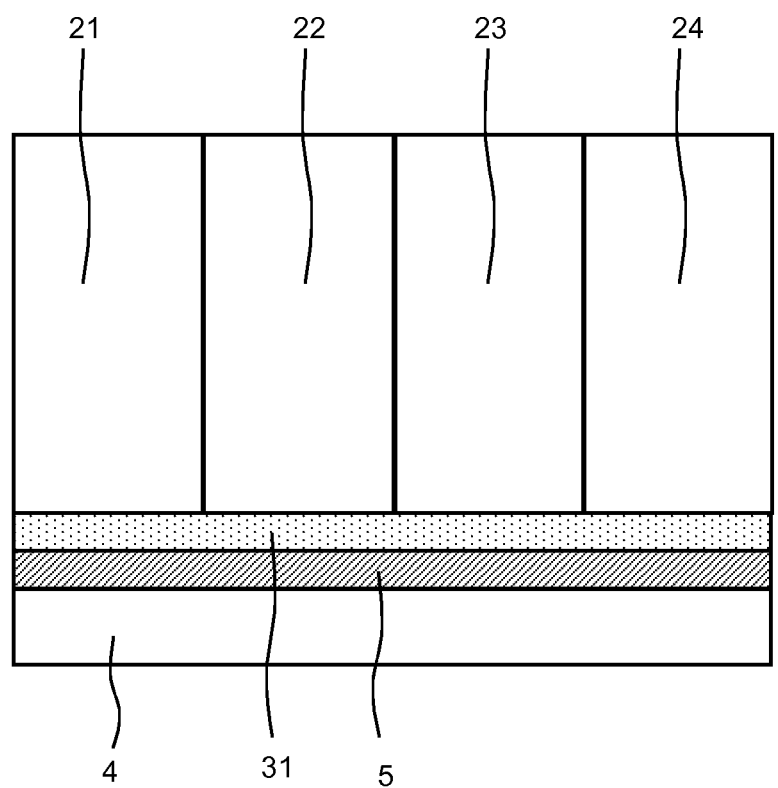
FIG. 2: a detailed view of the working example of a rechargeable battery arrangement according to the invention as sectional depiction.

FIG. 2 shows a detailed view of the above-described working example of a rechargeable battery arrangement 1 according to the invention in a sectional depiction. The rechargeable battery arrangement 1 has a structure identical to the configuration described in FIG. 1. In this case, too, four rechargeable battery elements 21, 22, 23, 24 are installed on a support 31 and screwed to the latter (screw connection not shown). The support 31 is configured as a thermally conductive plate and is in turn installed on the bottom plate 4 and screwed to the latter (screw connection likewise not shown). This ensures the stability of the rechargeable battery arrangement 1 to impacts or inclined positioning of the arrangement during operation.

As can be seen from FIG. 2, a thermally conductive layer 5 is present between the support 31 and the bottom plate 4. The heat generated by the rechargeable battery elements 21, 22, 23, 24 and conducted away to the supports is conducted away via this thermally conductive layer 5 to the bottom plate 4.

Figure 3:
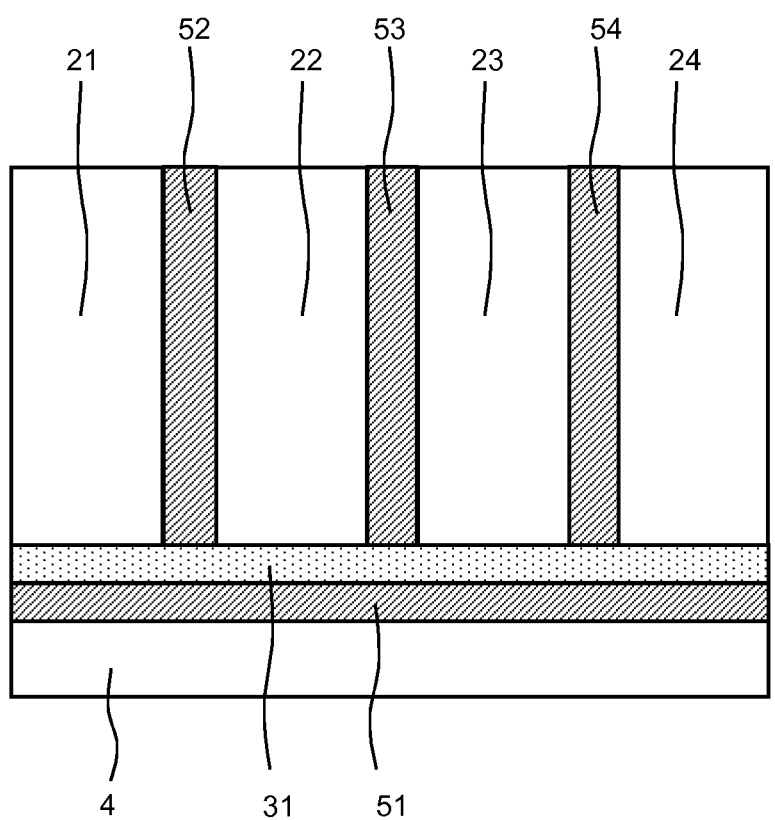
FIG. 3: a detailed view of a second working example of a rechargeable battery arrangement according to the invention as sectional depiction.

FIG. 3 shows a detailed view of a second working example of a rechargeable battery arrangement 1 according to the invention in a sectional depiction. The rechargeable battery arrangement 1 in the detailed view has a structure identical to the configuration described in FIG. 2, for which reason further details will not be gone into at this juncture. A difference from the above-described working example is that a thermally conductive layer 51 is located not only between the support 31 and the bottom plate 4, but instead a thermally conductive layer 52, 53, 54 is also installed perpendicularly to the support 31 between the individual rechargeable battery elements 21, 22, 23, 24. The heat generated by the individual rechargeable battery elements 21, 22, 23, 24 is in this way uniformly distributed by convection over the surrounding rechargeable battery elements 21, 22, 23, 24, as a result of which removal of heat to the support 31 and to the bottom plate 4 is optimized. It is within the scope of the invention for the thermally conductive layer 52, 53, 54 which is installed perpendicularly to the support 31 between the individual rechargeable battery elements 21, 22, 23, 24 to be present as continuous layer or only at points. This thermally conductive layer 52, 53, 54 is made of a thermal contact and filling material according to the invention; in the present case the layer has the same configuration as the thermally conductive layer 5.

The invention claimed is:

1. A rechargeable battery arrangement (1), comprising:
   at least one support (31, 32, 33, 34, 35, 36);
   at least one rechargeable battery element (21, 22, 23, 24) arranged on the support (31, 32, 33, 34, 35, 36);
   at least one bottom plate (4), with the support (31, 32, 33, 34, 35, 36) being arranged on the bottom plate (4);
   a thermally conductive layer (5) comprised of a thermal contact and filling material located at least one of between the bottom plate (4) and the support (31, 32, 33, 34, 35, 36) or between the rechargeable battery element (21, 22, 23, 24) and the support (31, 32, 33, 34, 35, 36), the thermal contact and filling material, comprising:
   at least one thermally conductive filler which comprises a metal hydroxide;
   at least one silicone-free base oil; and
   at least one chemically crosslinkable prepolymer mixture;

wherein the thermally conductive layer (5) is arranged detachably at least one of between the bottom plate (4) and the support (31, 32, 33, 34, 35, 36) or between the rechargeable battery element (21, 22, 23, 24) and the support (31, 32, 33, 34, 35, 36); and wherein the at least one chemically crosslinkable prepolymer mixture comprises at least one prepolymer and at least one crosslinker.

2. The rechargeable battery arrangement (1) as claimed in claim 1, wherein the crosslinker is an organofunctional silane.

3. The rechargeable battery arrangement (1) as claimed in claim 1, further comprising a polymerization catalyst.

4. The rechargeable battery arrangement (1) as claimed in claim 1, wherein a proportion of the thermally conductive filler in the thermal contact and filling material is in a range from 50 to 90 percent by weight.

5. The rechargeable battery arrangement (1) as claimed in claim 1, wherein a proportion of the silicone-free base oil in the thermal contact and filling material is in a range from 5 to 50 percent by weight.

6. The rechargeable battery arrangement (1) as claimed in claim 1, wherein a proportion of the chemically crosslinkable prepolymer mixture in the thermal contact and filling material is in a range from 1 to 15 percent by weight.

7. The rechargeable battery arrangement (1) as claimed in claim 1, wherein the silicone-free base oil is an ester.

8. The rechargeable battery arrangement (1) as claimed in claim 1, wherein the thermal contact and filling material has a curing rate of from 0.1 mm/day to 10 mm/day.

9. The rechargeable battery arrangement (1) as claimed in claim 1, wherein the thermal contact and filling material has a dynamic viscosity in a range from 50 to 500 Pa·s.

10. The rechargeable battery arrangement (1) as claimed in claim 1, wherein the thermal contact and filling material has a thermal conductivity in a range from 1 to 5 W/m·K.

11. The rechargeable battery arrangement (1) as claimed in claim 1, wherein the thermal contact and filling material has a specific density in a range from 1.5 to 2.5 g/cm3.

12. The rechargeable battery arrangement (1) as claimed in claim 1, wherein the thermal contact and filling material is silicone-free.

13. The rechargeable battery arrangement (1) as claimed in claim 1, wherein the thermally conductive layer (5) has a layer thickness in the range of 0.1 mm to 10 mm.

14. The rechargeable battery arrangement (1) of claim 1, wherein the prepolymer is an alkoxysilane-functionalized polyether.

15. The rechargeable battery arrangement (1) of claim 1, wherein the organofunctional silane is selected from the group consisting of vinyltrimethoxysilane, 3-aminopropyltrimethoxysilane, 3-glycidyloxypropyltrimethoxysilane.

* * * * *